United States Patent Office 3,366,368
Patented Jan. 30, 1968

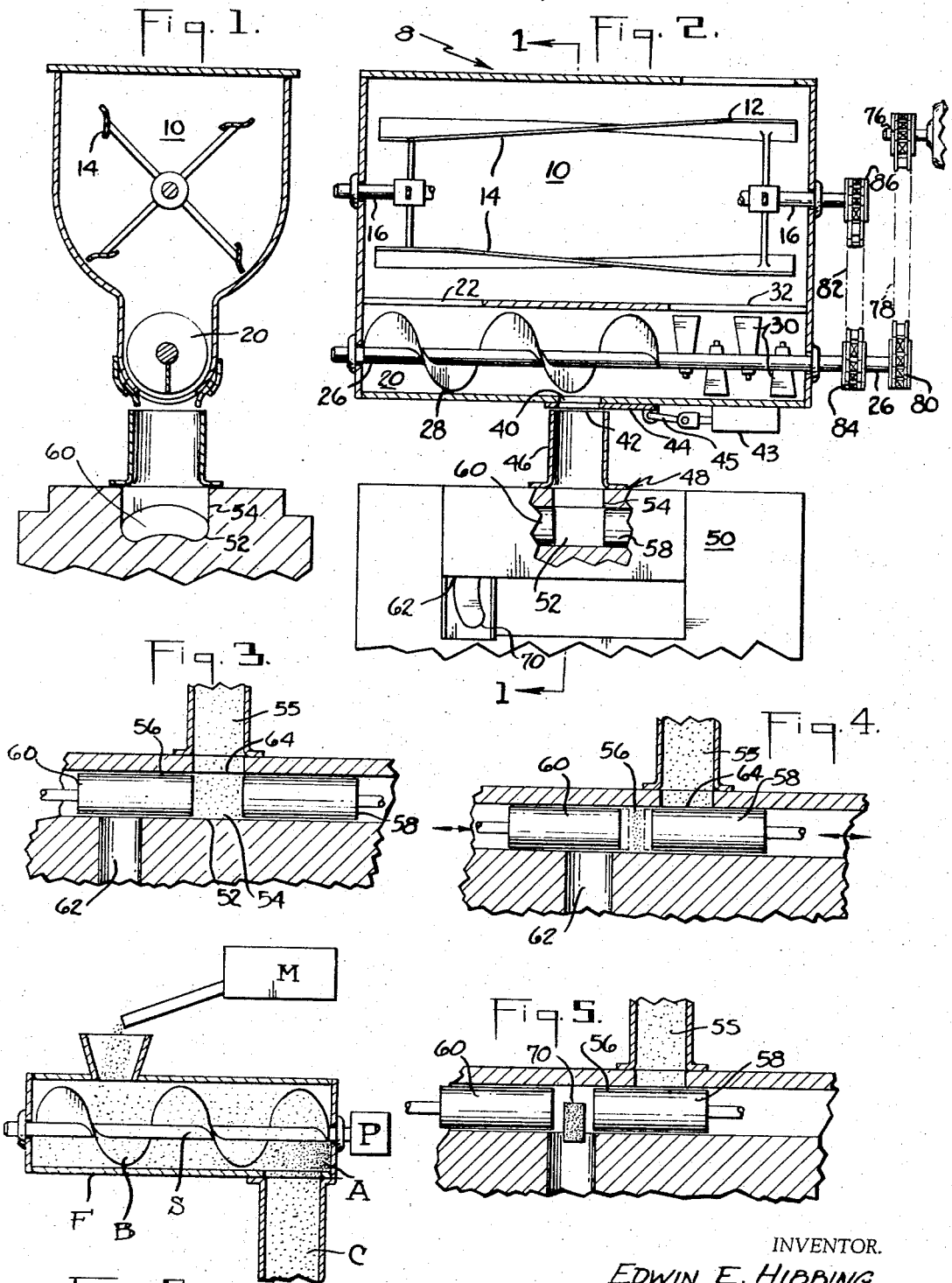

3,366,368
METHOD FOR FEEDING PARTICULATE
MATERIAL
Edwin E. Hibbing, Waukegan, Ill., assignor to Johns-Manville Corporation, New York, N.Y., a corporation of New York
Filed Oct. 19, 1965, Ser. No. 497,772
6 Claims. (Cl. 259—45)

ABSTRACT OF THE DISCLOSURE

A method for continuously advancing, from a supply source, a particulate composition, especially a composition having constituents of different densities, to the feed passage of a work station, and further advancing the composition back to the supply source when the feed passage is filled to deter undue compaction of the composition before it reaches the work station. Preferably, the particulate composition is formed into densified preform friction elements at the work station.

This invention relates generally to the mixing and feeding of powdered or finely divided material, such as used in fabricating preforms for use in molding machines. More particularly, it relates to method for feeding stock material, comprising constituents of varying densities, in a homogeneous state to a work station where further processing is to be carried out.

The great majority of commercial feeders employed to feed stock to a work station, where processing is carried out in a series of intermittent or discontinuous steps, are synchronized with the intermittent or discontinuous steps performed at the work station. When work is being conducted at the work station the feed mechanism is stopped. As a result, the material being fed or transported tends to compact and agglomerate at or in the passage leading from the discharge station of the feeding means to the work station. Further, when compositions comprising finely divided materials of varying densities are employed the various materials have a tendency to segregate from their uniformly dispersed state during the feeding process. As a result, heterogeneous products are usually produced at the work station. Also, difficulty has been encountered in feeding finely divided material on an intermittent basis to a discharge station because of the tendency for such material to compact and bridge the discharge opening and/or passage leading to the work station.

In the case of feeding stock material to a preform press, the stock material must be fed on an intermittent basis corresponding to the loading and unloading of the die cavity of the press. During the pressing operation, the flow of the material must be discontinued to the die cavity. Heretofore, the feeding mechanisms were stopped during the pressing operation. Upon resumption of feeding to the die cavity of the press, the initial feed would be more compact and compressed than the other material. In some cases, the material compacts to such an extent that flow is disrupted, the material agglomerates, breaks off in "chunks," and thus heterogeneous products result.

It is understandable that in any process of advancing finely divided material, particularly through the use of mechanical expresser means, that some compacting of the material will occur. However, this invention is concerned with deterring compaction which causes the finely divided material to agglomerate prematurely, i.e., during the feeding process.

Therefore, it is an object of this invention to provide new and improved method for feeding stock material to a work station whereby compacting and agglomeration of the stock material is deterred.

Another object of this invention is to provide a method for continuously feeding a heterogeneous composition wherein the ingredients are homogeneously dispersed to a discharge station.

Still another object of this invention is to provide a method for homogeneously mixing heterogeneous constituents of stock material and advancing the stock material in a steady flow state in a manner whereby homogeneous dispersion of the material is not disrupted.
the material is not disrupted.

Further objects and advantages of this invention will appear from the following description of a species thereof and from the accompanying drawings.

FIG. 1 is a schematic end view of mixing and feeding apparatus and preform press for carrying out the invention;

FIG. 2 is a side elevational schematic view of the apparatus shown in FIG. 1;

FIG. 3 is a fragmentary schematic view of the preform press shown in FIG. 2 illustrating the loading position of the mechanism;

FIG. 4 is a view similar to FIG. 3 illustrating the forming position of the mechanism;

FIG. 5 is a view similar to FIG. 3 illustrating the eject position of the mechanism; and FIG. 6 is a schematic representation of a prior art mechanism for mixing and feeding particulate material.

A preferred embodiment of this invention is adapted to be conducted in conjunction with a preform press employed to fabricate preforms for use in molding machines. In accordance with the invention, the constituents of the preform composition are fed in powdered or finely divided form to a first chamber where blend mixing of the constituents is facilitated by the use of agitating means. Subjacent to the mixing chamber is a barrel chamber having an inlet adjacent to an axial end thereof for receiving a portion of the material from the mixing chamber. A rotatable shaft, extending through said barrel chamber, carries first advancing means, which may be in the form of an auger, for advancing the material introduced at the inlet through a discharge station disposed between the axial ends of said barrel chamber. A discharge opening is provided at the discharge station through which opening segments of the composition material may be fed to a work station. Initially, the material is advanced to the feed passage leading to the work station until the passage is completely filled. After the passage is filled, the material is advanced through the work station to an exit opening which is positioned at the axial end of the barrel chamber opposing the inlet end. The shaft extending through the barrel chamber also carries second advancing means which may be in the form of radial impellers, for projecting the material from the barrel chamber back into the mixing chamber. A portion of the material which has been advanced to the work station feed passage is projected into the die cavity of the preform press for compressing and forming into the preform. The preforming operation may be conducted as a one continuous compression step or in a series of "bumping" steps. After the preform is fully compressed and formed, it is released from the die cavity and a piston of the press is retracted sufficiently so that additional material from the passage advances gravitationally into the die cavity. When the reciprocating piston of the preform press is retracted, the column of material in the feed passage lowers and some of the material which is normally being axially advanced through the barrel chamber is gravitationally discharged through the opening of the discharge station to refill the work station passage chute. After the passage is filled, the material is again continuously axially advanced through the barrel chamber and back to the mixing chamber.

Compositions of finely divided particles for which the method and apparatus of this invention are particularly adapted are exemplified by friction disc formulations such as those which include:

Phenol formaldehyde resin
Graphite
Rubber friction particles
Mica
Barytes, fine
Metallic powder
Fillers
Asbestos fiber The barytes and metallic powder particles are relatively dense and tend to settle out, or segregate from the relatively light particles. Hence, it is difficult to fabricate from such formulations products which have all of the ingredients homogeneously dispersed therethrough with conventional feeding devices.

Referring to FIG. 1, there is shown feed mechanism 8 which generally comprises mixer 12 and a feed or barrel chamber 20. Powdered or finely divided composition material is introduced into the chamber 10 of mixer 12. It will be understood that the material may be mixed prior to being introduced into chamber 10 and that in such case the mixer 12 will serve to maintain the homogeneous disposed state of the material. The mixer thereshown comprises the axially extending chamber 10 having agitating means, shown to be in the form of a series of impeller blades 14 mounted for rotatable movement on shaft 16. Subjacent to the chamber 10 is barrel chamber 20 adapted to receive the material from chamber 12 through inlet 22 after the material is thoroughly mixed. The inlet 22 is shown to be positioned adjacent a first axial end of chamber 20. Within chamber 20 is disposed a rotatable shaft 26, which carries what may be termed first advancing or expressing means, shown to be in the form of an auger or screw 28 at an opposing end of the barrel chamber 20. Also shown to be mounted for rotational movement on the shaft 26 are impellers 30, which may be termed second advancing or expressing means. The impellers 30 are adapted to advance the material from the barrel chamber 20 back into the mixing chamber 10 through exit opening 32. This arrangement provides a system whereby the material is continuously advanced from the mixing chamber 10 through the barrel chamber 20 and back into the mixing chamber 10, except for certain intermittent feedings to a work station which will now be described.

Positioned between, not necessarily half way, the inlet opening 22 and the exit opening 32 of the barrel chamber 20 is a discharge opening 40 which forms a part of the discharge station 42. The discharge station 42 may be considered to comprise the portion of the barrel chamber 20 which is immediately superjacent to the discharge opening 40 and the corresponding portion of the first expresser means 28. In a preferred embodiment, the discharge opening 40 is constantly maintained in an open position.

Alternatively, gate means such as slidable member 44 may be provided to intermittently open and close the discharge opening 40 at the discharge station 42 through power motor 43 and appropriate linkage 45.

Subjacent to the discharge opening 40 is also shown a work station passage chute 46 which leads to a work station 48, such as a preform press 50. It will be understood that the work station 48 may be any station where further processing of the material is to be conducted and hence is not necessarily limited to a preform press. However, in order to move aptly describe the operation of the feeding mechanism it will be described in conjunction with the operation of a preform press.

The preform press 50 and its operational sequence are schematically illustrated in FIGS. 3–5. The press 50 is shown to comprise a die cavity 52 having a well portion 54 in alignment with passage chute 46 for receiving a supply of compressible stock material for advancement to the forming section 56, adjacent to the well 52, where the material is compressed into the preform state; a pair of reciprocating pistons 58 and 60 which cooperate to compress the material; and a discharge opening 62 through which the preforms 10 are ejected from the press. The die cavity 54 and the pistons 58 and 60 have transverse cross-sectional configurations which correspond to the desired cross-sectional configuration of the preform to be formed. In this case, the preform is a kidney-shaped friction pad used in disc-type brakes. While this invention is particularly adapted for the production of such friction pad preforms, the method and apparatus may be advantageously employed in the production of other compositions of finely divided and compressible materials and of other configurations.

The operation of the mixing, feeding, and forming mechanisms will now be described with reference to FIGS. 3–5. In FIG. 3, the piston 58 is in a position retracted from the forming section 56 and from the well portion 54. The piston 60 at this time is in fully advanced position adjacent to the well portion 54. The material in column 55 descends to fill the well portion 54. The pistons 58 and 60, through suitable control means, shift to the left to transfer the section of the column of material in well portion 54 to forming section 56, as may be seen in FIG. 4. It will be noted that the piston 58 is of sufficient length to close off the opening 64 and stop the feeding of additional material while the piston 58 is in the advanced forming position. The piston 60 while in the forming position closes off preform discharge opening 62. The material in the forming section 56 is preferably progressively compressed by mutually advancing the pistons 58 and 60 toward each other in a series of "bumping" steps. The "bumping" steps comprise alternately advancing and retracting the pistons 58 and 60 toward and away from each other in a manner whereby with each successive advancing step the material in the forming section 56 is further compressed. After the material in forming section 56 is compressed to the desired size, the pistons 58 and 60 are shifted to the left, as may be seen in FIG. 5, whereupon the puck or preform 70 is ejected by virtue of the uncovering of the opening 62 by piston 60 and the pushing of piston 58. It is preferred to conduct the preforming operation in the series of "bumping" steps in order to deter the inclusion or entrapment of gases within the preform. With each retracting movement within the "bumping" steps any gases which might otherwise be occluded in the preform are discharged. However, it will be understood that with compositions where the occlusion of gases does not present a serious problem, the compression forming process may be conducted by mutually advancing the pistons 58 and 60 in continuous fashion until the desired thickness of the preform is obtained.

During the time the compression or preforming operation is conducted the discharge opening is literally closed so that the material that is introduced into the barrel chamber 20 from the mixing chamber 10 is continuously and axially advanced through the barrel chamber 20. As the compression forming operation is completed and the piston 58 is retracted the column of material in the discharge chute 46 lowers to automatically fill up the well 54 in readiness for the next compression step. When the chute 46 is refilled, the material within the barrel chamber 20 continues to be advanced toward the discharge end of the barrel chamber 20 and back into the mixing chamber 10.

The continuous flow of the material deters densification of the material within the discharge chute and bridging of the discharge chute 46 and its opening 40. Such continuous flow also deters segregation of the components of the preform composition.

The shafts 26 and 16 are shown to be commonly driven by means of a variable speed drive 76. Shaft 26 is directly driven through chain 78 and sprocket 80 while shaft 16 is driven, by chain 82 and sprockets 84 and 86, from shaft 26. It will be understood, however, that separate drive means may be provided for each of the shafts 26 and 16.

FIG. 6 illustrates one type of prior art device illustrating some of the disadvantages which the present invention obviates. The material to be processed is introduced into mixer M and is batch fed into the feeder F, having auger B driven by shaft S and power means P into chute C. After chute C is filled, additional material tends to compact, agglomerate, and "hang-up" at area A. When the material does break away, it does so in chunks and thus the desired homogeneous dispersion is disrupted and interferes with the further processing.

Although the method has been described in detail as to its component steps, it will be understood that such detail is for the purpose of illustration and not by way of limitation. The appended claims are therefore intended to cover any such modifications coming within the true scope of the invention.

What I claim:

1. The method of mixing and feeding a composition of particulate materials, at least one of said materials being of higher density than another of said materials, which method comprises:
    (a) intimately blending the constituents of the composition in a first chamber;
    (b) directing an intimately blended portion of said composition into a second chamber;
    (c) advancing said portion through said second chamber at a constant rate;
    (d) intermittently discharging some of said portion in particulate form at a discharge station;
    (e) and impelling other of said portion in particulate form from said second chamber back to said first chamber.

2. The method of processing a particulate composition, which method comprises:
    (a) intimately blending the constituents of the particulate composition in a first chamber;
    (b) directing an intimately blended portion of said composition in dry particulate form into a second chamber;
    (c) advancing said portion through said second chamber and intermittently discharging segments of said portion at a discharge station to a work station feed passage;
    (d) advancing said segments to a work station for further processing, said segments being advanced in volumes and at rates which correspond substantially to the volume and rate at which said composition is processed at said work station; and
    (e) recirculating by impelling other segments of said portion away from said second chamber and to said first chamber when said feed passage is filled to deter compacting said composition in said feed passage.

3. The method of forming a densified preform from a particulate composition, which method comprises:
    (a) intimately blending the constituents of the composition in a first chamber;
    (b) directing an intimately blended portion of said composition into a second chamber;
    (c) advancing said portion through said second chamber at a constant rate;
    (d) advancing segments of said portion through a feed passage to a work station where the material of said segments is compressed sufficiently to form self-sustaining preform units;
    (e) said segments being discharged in an unagglomerated state from said second chamber to said feed passage in separate volumes which correspond to the separate volumes advanced from said feed passage to said work station; and
    (f) impelling other segments of said portion from said second chamber back to said first chamber.

4. The method of forming densified preforms from essentially particulate constituents, which method comprises:
    (a) blending said particulate constituents in a first chamber;
    (b) directing a blend of said constituents in particulate form into a second chamber;
    (c) discharging portions of said blend in particulate form to a forming press; and
    (d) compacting the discharge portions in said press to form densified elements while impelling other portions of said blend from said second chamber back to said first chamber to deter premature compacting of the particulate constituents of subsequently formed densified elements.

5. The method of forming a densified friction element preform consisting essentially of dry particulate constituents, which method comprises:
    (a) intimately blending said dry particulate constituents in a first chamber;
    (b) directing a blend of said constituents in dry particulate form into a second chamber;
    (c) discharging portions of said blend to a feed passage leading to a preform press; and
    (d) compressing the portions of said blend directed to said preform press to form densified friction element preforms while advancing other portions of said blend across said feed passage and impelling said other portions of said blend back into said first chamber to deter premature compacting of said particulate constituents in said second chamber and said feed passage.

6. The method as described in claim 5, wherein:
    said friction element preform is formed by a series of compression steps to deter the occlusion of any gases.

References Cited
UNITED STATES PATENTS

| | | | |
|---|---|---|---|
| 843,565 | 2/1907 | Misner. | |
| 1,457,325 | 6/1923 | Thatcher. | |
| 1,837,565 | 12/1931 | McDougall | 259—46 |
| 2,390,186 | 12/1945 | Sharp | 259—46 |
| 2,411,138 | 11/1946 | Roberts | 259—45 X |
| 2,738,550 | 3/1956 | Groves | 18—16.5 |

WILLIAM I. PRICE, *Primary Examiner.*

J. M. BELL, *Assistant Examiner.*

UNITED STATES PATENT OFFICE
CERTIFICATE OF CORRECTION

Patent No. 3,366,368                      January 30, 1968

Edwin E. Hibbing

It is certified that error appears in the above identified patent and that said Letters Patent are hereby corrected as shown below:

Column 2, line 12, strike out "the material is not disrupted."; column 4, line 10, for "10" read -- 70 --.

Signed and sealed this 22nd day of July 1969.

(SEAL)
Attest:

Edward M. Fletcher, Jr.            WILLIAM E. SCHUYLER, JR.

Attesting Officer                     Commissioner of Patents